July 4, 1950
L. E. KAHN ET AL
2,513,877
ANIMAL SHACKLING APPARATUS
Filed May 16, 1946
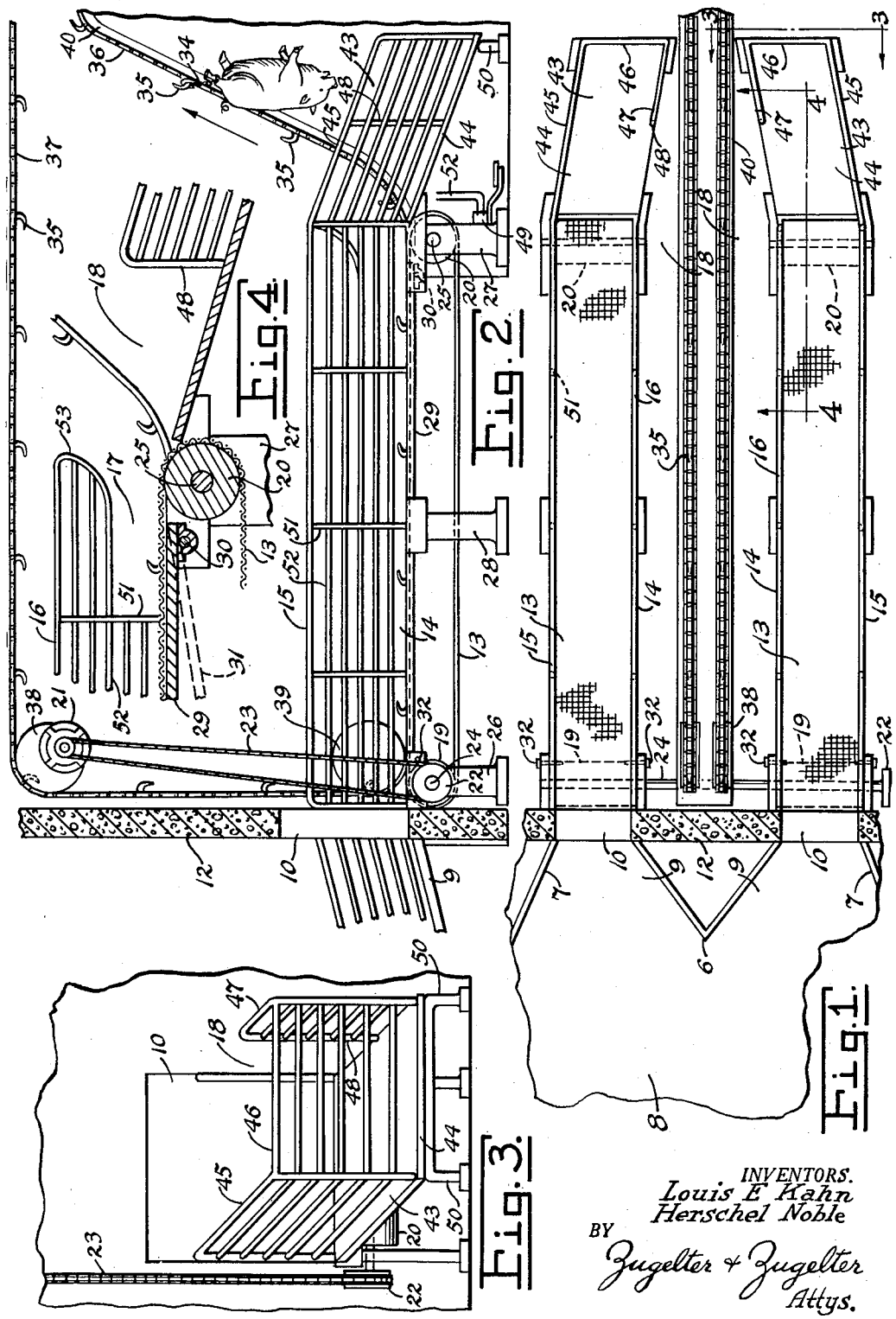
INVENTORS.
*Louis E. Kahn*
*Herschel Noble*
BY *Zugelter & Zugelter*
Attys.

Patented July 4, 1950

2,513,877

UNITED STATES PATENT OFFICE 2,513,877

ANIMAL SHACKLING APPARATUS

Louis E. Kahn and Herschel Noble, Cincinnati, Ohio, assignors to The E. Kahn's Sons Company, Cincinnati, Ohio, a corporation of Ohio Application May 16, 1946, Serial No. 670,075

3 Claims. (Cl. 17—24)

This invention relates to an animal shackling apparatus for use in meat packing plants and the like.

One of the objects of the invention is to provide a safe and convenient means of shackling animals in preparation for their slaughter.

Another object of the invention is to provide a means whereby relatively unskilled workmen may shackle animals in meat packing plants.

Another object is to provide a means whereby animals may be shackled in an orderly manner and at a faster rate of speed than former methods permitted.

These and other objects and advantages are attained by the means described herein and illustrated in the accompanying drawings in which:

Fig. 1 is a top plan view of the animal shackling apparatus.

Fig. 2 is a side elevation of the apparatus.

Fig. 3 is an end view taken on line 3—3 of Fig. 1.

Fig. 4 is a cross sectional view taken on line 4—4 of Fig. 1.

In preparation for killing animals, such as hogs, in meat packing plants and slaughter houses, the animals are shackled and suspended at a convenient height. In former practice it was necessary for the workman to enter a pen, squat down on the floor in order to grasp a hind leg of an animal, and apply a shackle chain thereto, in preparation for delivery to the killing room. This procedure required a great deal of skill and experience on the part of the animal shackler, and subjected him to a certain amount of danger by his close association with a penful of milling, excited animals. Moreover, the work was highly fatiguing and laborious, and therefore not conducive of efficiency in the operation of the plant.

The present invention obviates the foregoing objections. Referring to the drawings, Fig. 1 shows a double unit of the animal shackling apparatus as seen from above. The animals to be shackled in preparation for slaughter are herded into the receiving pen 8, which contains ramps 9 leading through the openings 10 in a wall 12, and to the endless conveyors 13 of the runways 14. The runways may be one or more in number, depending on the number of animals to be processed, and are at a suitable elevation from the floor for the convenience of the operators. Dividing and confining rails or walls are indicated at 6 and 7.

Each runway is enclosed on opposite sides by suitable means, such as pipe rails, fencing, etc. The railing 15 completely encloses the outer side of the runway for its entire length, while the railing 16 has an opening 17 (see Fig. 4) at its terminus, adjacent to the operator's station 18. Vertical posts at spaced intervals, as at 51, may be provided for the support of the horizontal bars 52 of the runway enclosing railings 15 and 16. It should be noted that the right hand terminus 53 of the railing 16 is an overhang, and has no post reaching to the floor of the runway. This provides a working space free of obstruction, from the opening 17 to the vertical post 48 of an escape cage 43 to be more fully described hereafter.

The railings 15 and 16 may be parallel and disposed at a height sufficient to retain the animals within the runway. The floor of the runway may consist of an endless screen conveyor 13, movable in the direction of the shackling operator, and supported on rollers 19 and 20 which are driven by suitable means, such as a motor 21 through pulley 22 and belt or chain 23. The shafts 24 and 25 of the rollers, may be journaled in the supports 26 and 27, which, along with 28, support the runway. To give rigidity to the conveyor 13, a support in the form of a plate 29, of steel or other suitable material, may be added. For ease of cleaning the conveyor, the plate may be pivoted at one end 30, permitting the plate to be lowered at the other end, as at 31, thus facilitating flushing or scraping operations. Said plate may be supported at said other end by means of the pins 32, removable for displacing the plate from its normal supporting position.

As hereinbefore explained, the animals to be processed enter the runway through either opening 10, step onto the conveyor 13, and are advanced thereby preferably in single file, to the opposite end of the runway, until they reach opening 17, at which point the shackling operator, standing in a normal upright position at the station 18, applies a shackle chain 34 around a leg of each animal as it comes abreast of him. He then attaches the free end of the shackle chain to a hook 35 of the hoist 36, which is constantly moving at a suitable rate of speed, in the direction of the arrow and which carries the shackled animal into the killing room. It is thus obvious that this method is far superior to the former method of shackling animals, wherein it was necessary for the shackler to assume a squatting position in a pen of excited animals in order to apply the shackle chains. The present invention enables inexperienced workmen to do the work that once required skilled operators.

The hoist 36, which may be one of several available on the market, is of the endless chain type, comprising in combination a series of hooks 35 suitably spaced along the entire length of the endless chain 37, which is in constant motion in the direction of the arrow. The hoist includes rollers or sprockets 38 and 39 over which the chain travels, and a frame 40 in which are disposed suitable tracks or guides to carry the chain and hooks upwardly with their load of shackled animals, and other standard mechanisms not shown on the drawing. The frame 40 may be a plate or the like for supporting the weight of the chain 37 and animals carried by the chain and may be grooved or otherwise shaped to receive the chain. As is obvious, the loaded hoist enters the killing room, where the shackled animals are slaughtered in preparation for further processing and removed from the hoist, the chain and hooks of which return over the sprockets 38 and 39 ready to receive other shackled animals at the operator's working station 18. In the exemplification herein illustrated, a double hoist is situated parallel to and between the runways of a double unit shackling apparatus.

At times an animal may elude the shackle operator and pass the operator's station 18, and to meet this contingency, an escape cage has been provided, as at 43. The cage may comprise an inclined smooth floor 44, a side railing 45 which encloses the outer or far side of the escape cage for its entire length, an end railing 46, and an inner railing 47 parallel to the side railing 45, and terminating at the vertical post 48, thus enclosing substantially the lower half of the escape cage. The lower end of the cage may be supported by legs 50—50. To control the advancement of animals by the conveyor, suitable means such as a pedal-operated switch 49 may be furnished at the operator's station, to selectively open and close the circuit of motor 21 by way of conductors 52. As a further convenience for the operator, the escape cage may be disposed obliquely to the longitudinal axis of runway 14, as shown in Figs. 1 and 3, whereby easier access may be had to the hooks 35 of the hoist after the operator has shackled the animals, since he is not required to turn completely around to reach the hooks behind him.

As noted, the smooth floor of the escape cage is inclined downwardly from the end of the runway, an arrangement which makes it difficult for an animal to back up after it leaves the conveyor of the runway and reaches the inclined floor of the escape cage, since the animal loses its power of rearward locomotion when the forefeet are placed on a lower plane than the hind feet. This is an animal characteristic well known to those skilled in the art of meat packing.

The structure herein described and illustrated is to be considered typical or exemplary only, as the installation may require modification in adapting it to existing equipment and limitations offered at the site of erection. Accordingly, it is to be understood that various structural changes may be made within the scope of the appended claims, without departing from the spirit of the invention. For instance, the walls of a building may form the outer enclosure of the runway, thus eliminating the railings 15 shown on the drawing. The shackling apparatus may in some cases consist of a single runway, in which event a single animal hoist might be arranged parallel to the runway and immediately behind the operator's station 18. The hoist herein disclosed is of a common type, but may incorporate variations of structure in adapting it to particular circumstances of installation, as will be understood.

What is claimed is:

1. Animal shackling apparatus comprising in combination, a moving hoist, an elevated driven endless conveyor for advancing live animals toward the hoist, an entrance ramp at one end of the conveyor, an escape cage at the other end thereof, and animal confining means along the conveyor, including a railing extending from the entrance ramp to approximately the location of the escape cage, the railing having an overhanging portion in advance of the cage providing an access opening at one side of the conveyor, at which the animals are rendered accessible for shackling and attachment to the hoist.

2. Animal shackling apparatus comprising in combination, a moving hoist, an elevated driven endless conveyor for advancing live animals toward the hoist, an entrance ramp at one end of the conveyor, an escape cage at the other end thereof, animal confining means along the conveyor, including a railing extending from the entrance ramp to approximately the location of the escape cage, the railing having an overhanging portion in advance of the cage providing an access opening at one side of the conveyor, at which the animals are rendered accessible for shackling and attachment to the hoist, and a supporting plate beneath the conveyor to carry the weight of the animals imposed upon the conveyor, the plate being displaceable for cleaning purposes.

3. Animal shackling apparatus comprising in combination, an elevated and confined endless conveyor, means for driving the conveyor, a moving hoist arranged to carry animals from the conveyor to a higher elevation, a shackling station for the conveyor at which animals are rendered accessible for shackling and attachment to the hoist, a ramp at one end of said conveyor leading the animals onto the conveyor, and an escape cage at the opposite end of the conveyor beyond the shackling station, said cage including a downwardly inclined smooth floor constituting a slide to displace animals passing the shackling station, said escape cage being closed to prevent escape of the animals.

LOUIS E. KAHN.
HERSCHEL NOBLE.

REFERENCES CITED

The following references are of record in the file of this patent:

UNITED STATES PATENTS

| Number | Name | Date |
|---|---|---|
| 712,579 | Nicholson et al. | Nov. 4, 1902 |
| 2,136,228 | Babson et al. | Nov. 8, 1938 |

FOREIGN PATENTS

| Number | Country | Date |
|---|---|---|
| 666,024 | Germany | Oct. 8, 1938 |